United States Patent [19]

Gu

[11] Patent Number: 5,831,575
[45] Date of Patent: Nov. 3, 1998

[54] SATELLITE NAVIGATION METHOD

[75] Inventor: Xiaogang Gu, Erbach, Germany

[73] Assignee: NFS-Navigations- und Flugfuehrungs-Systeme GmbH, Ulm, Germany

[21] Appl. No.: 727,653

[22] PCT Filed: Apr. 12, 1995

[86] PCT No.: PCT/DE95/00471

§ 371 Date: Oct. 9, 1996

§ 102(e) Date: Oct. 9, 1996

[87] PCT Pub. No.: WO95/27909

PCT Pub. Date: Oct. 19, 1995

[30] Foreign Application Priority Data

Apr. 12, 1994 [DE] Germany .......................... 44 12 336.1
Mar. 8, 1995 [DE] Germany ........................ 195 08 208.7

[51] Int. Cl.$^6$ .............................. H04B 7/185; G01S 5/02
[52] U.S. Cl. ......................................................... 342/357
[58] Field of Search ........................ 342/357; 364/449.7; 701/213

[56] References Cited

U.S. PATENT DOCUMENTS 5,072,227  12/1991  Hatch ....................................... 342/357
5,359,332  10/1994  Allison et al. ........................... 342/357
5,477,458  12/1995  Loomis .................................... 342/357

FOREIGN PATENT DOCUMENTS 0574009  12/1993  European Pat. Off. .
0588598   3/1994  European Pat. Off. .

OTHER PUBLICATIONS

B. W. Remondi: "Global Position System carrier phase: description and use"; In: Bulletin Geodesique, 1985, France, vol. 59, No. 4, pp. 361–377.

X. Gu: "DGPS Positioning Using Carrier Phase for Precision Navigation". In: IEEE 1994 Position Location and Navigation Symposium, Proceedings of 1994 IEEE Position, Apr. 1994, New York, pp. 410–417.

R. Swider: "FAA's DGPS CAT III Feasibility Program: Update and Test Methodology". In: IEEE, pp. 239–245.

R. Hatch: "The Synergism of GPS Code and Carrier Measurements". In: Proc. of the $3^{rd}$ Int. Geodetic Symp. On Satellite Doppler Positioning, Las Cruces, Feb. 1982, vol. 2, pp 1213–1231.

R. Hatch: "Instantaneous Ambiguity Resolution". In: Schwarz KP, Lachapelle G (eds): Kinematic systems in geodesny, surveying and remote sensing, Springer, pp. 299–308.

H. Landau: "The Key to Decimeter–Level Differential GPS Navigation: Carrier Phase Ambiguity Determination in Real–Time". In: $1^{st}$ Int. Symp. For Real Time Differential Applications . . . , Sep. vol. 1, pp. 36–43.

H. Abidin et al.: "Multi–Monitor Station 'On the Fly' Ambiguity Resolution: Theory and Preliminary Results". In: $1^{st}$ Int. Symp. For Real Time Differential Appl. of the Global Pos. System, Sep. vol. 1, pp. 44–56.

B. Remondi: "Kinematic GPS Results without Static Initialization". In: NOAA Technical Memorandum NOS NGS–55, Rockville, MD, pp. 1–25.

R. Hatch: "Ambiguity Resolution in the Fast Lane". Article, date unknown.

(List continued on next page.)

*Primary Examiner*—Theodore M. Blum
*Attorney, Agent, or Firm*—Spencer & Frank

[57] ABSTRACT

A satellite navigation process, in particular for an automatic landing process for aircraft, according to the ICAO requirements under the CAT-II or CAT-III terms. The necessary degrees of accuracy are achieved by analytical phase evaluation of the carrier signals of at least seven satellites (GPS and/or GLONASS and/or reference stations).

6 Claims, 9 Drawing Sheets

OTHER PUBLICATIONS

G.L. Mader: "Dynamic Positioning Using GPS Carrier Phase Measurements", manuscripta geodaetica, Springer–Verlag 1986, pp. 272–277.

X. Gu: "DGPS Positioning Using Carrier Phase for Precision Navigation". IEEE 1994—Symposium Las Vegas/Nevada, Apr. 11–15, 1994, pp. 410–417.

H.Z. Abidin: "On–the–Fly Ambiguity Resolution". GPS World, Apr. 1994, pp. 40–50.

B. Remondi: "Pseudo–kinematic GPS Results Using the Ambiguity Function Method". In: Navigation: Journal of the Institute of Navigation, vol. 38, No. 1, Spring 1991, pp. 17–36.

SATELLITE NAVIGATION METHOD

CROSS-REFERENCE TO RELATED APPLICATIONS

This application claims the priority of German applications P 44 12 336.1 filed Apr. 2, 1994 and 195 08 208.7 filed Mar. 8, 1995.

BACKGROUND OF THE INVENTION

1. Field of the Invention

The invention relates to a satellite navigation method as defined in the preamble to claim 1.

The invention can be used particularly in the navigation of aircraft during landing.

The evaluation of suitable satellite signals is possible for navigation, particularly three-dimensional navigation. Such satellites are combined to form GPS (Global Positioning System) and GLONASS (GLobal Orbiting NAvigation Satellite System) navigation systems. GPS and GLONASS form GNSS (the Global Satellite Navigation System). The signals emitted by these satellites can be evaluated in different ways as a function of the required precision. One type of satellite navigation employs the evaluation of the code-phase or carrier-phase measurements of a GNSS user receiver that is installed on board a vehicle, for example an aircraft, whose position is supposed to be determined. The differential function (DGNSS) of GNSS is used to increase the navigation precision. In this instance, a second receiver, called reference receiver, is used at a known position in addition to the user receiver. The reference receiver determines measuring errors based on the known antenna position, and corrects the measurements of the user receiver.

In high-precision types of navigation, for example automatic aircraft landings, for safety reasons precision must be within the meter or even decimeter range. For example, from the microwave landing system (MLS), the US air travel authority, the FAA (Federal Aviation Administration [sic]), has derived precision requirements (95%) for navigation sensors for precision landings using GNSS under the CAT I/II/III visual conditions of the International Civil Aviation Organisation (ICAO); these requirements are shown below in Table 1.

|         | DH     | Horizontal |         | Vertical |         |
|---------|--------|------------|---------|----------|---------|
|         |        | PFE        | CMN     | PFE      | CMN     |
| CAT I   | 200 ft | ±5.1 m     | ±4.1 m  | ±2.4 m   | ±1.2 m  |
| CAT II  | 100 ft | ±4.4 m     | ±3.5 m  | ±1.2 m   | ±0.6 m  |
| CAT III | 50 ft  | ±4.0 m     | ±3.2 m  | ±1.2 m   | ±0.6 m  |

Feet (ft) are the standard unit of measurement in air travel; the abbreviations stand for the following:

DH: Decision Height

PFE: Path Following Error (low-frequency error component)

CMN: Control Motion Noise (high-frequency error component)

In the DGNSS method (or DGPS method for GPS), errors that occur during measurements made with GNSS receivers, for example satellite clock errors, satellite path model errors, atmospheric errors and the influence of the earth's rotation, can be reduced by the differential function. Other errors, however, such as noise, influences of multiple-path propagation and dynamic influences, are uncorrelated between measurements by user receivers and reference receivers. These errors cannot be reduced by forming a difference.

In code measurements, the interfering influences of noise and dynamics on the determination of position are typically within the meter range. The interfering influences of multiple paths in code measurements can even cause a navigation error greater than 100 m when strong multiple-path reflections take place. The uncorrelated errors in the carrier-phase measurements, in contrast, range only from millimeters and centimeters, and are significantly smaller in comparison to corresponding errors in code measurements. In contrast to code measurement, however, carrier-phase measurement initially has an ambiguity that is associated with the number of wavelengths on the path of the signal transmission from a satellite to a (user and or reference) receiver.

2. Description of the Related Art

A known method that combines the complementary procedures of code measurement and phase measurement under the name "carrier-smoothed code" [Hatch, R. (1982): "The Synergism of GPS code and carrier measurements", Proceedings:

Third International Symposium on Satellite Doppler Positioning, Las Cruces, February 1982, Volume 2, pages 1213–1231] can reduce the influence of code noise on the navigation error to the centimeter range. In this method, the receiver dynamics are determined between two points in time by way of the carrier-phase measurement, and the phase ambiguity is determined approximately by way of the phase-smoothed code measurement. This method is presently used widely for real-time applications of GPS navigation. A disadvantage of the method is the relatively high sensitivity to multiple-path propagation influences due to the still-present code-measurement component. The precisions achieved with this method have not yet attained the vertical precision of 1.2 m, which is required for landings, with a probability of 95% (CAT III PFE requirement).

A pure carrier-phase evaluation is used to achieve the precisions with a standard deviation in the centimeter or lower decimeter range. In this case the phase ambiguities must be resolved under dynamic conditions. Search methods for determining the phase ambiguities under kinematic conditions (moved receiver) are known, for example from the publications Hatch, R., (1990): "Instantaneous Ambiguity Resolution", in: Schwarz K P, Lachapelle G (eds.): Kinematic systems in geodesy, surveying and remote sensing. Springer, New York, Berlin, Heidelberg, London, Paris, Tokyo, Hong Kong, 299–308.

Landau, H.; Euler, H. J., (1991): "The Key to Decimeter-Level Differential GPS Navigation: Carrier Phase Ambiguity Determination," Proceedings of the First International Symposium for Real Time Differential Applications of the Global Positioning System, Braunschweig, September 1991, vol. 1.

Abidin, H. Z./Wells, D. E./ Kleusberg, A. (1991): "Multi-Monitor Station 'On The Fly' Ambiguity Resolution. Proceedings: First International Symposium for Real Time Differential Applications of the Global Positioning System, Braunschweig, September, vol. 1.

Remondi, B. W. (1991): "Kinematic GPS Results without Static Initialization", NOAA Technical Memorandum, NOS NGS-55, Rockville, Md.

A particular disadvantage of search methods of these types is that a search space must be predefined. If the space is selected to be large, a large amount of the computer is used in real time. If only a small search space is predefined in order to avoid this disadvantage, then the disadvantage is the possibility that the searched-for solution lies outside of the search space, and therefore cannot be determined.

Moreover, in addition to a searched-for, global primary minimum, a plurality of secondary minima can be present in the search space in a disadvantageous manner. The possibility then exists that a search process will latch onto one of these secondary minima and thus produce a false solution.

A navigation method employing the Global Positioning System (GPS) is further known from BULLETIN GEODESIQUE, 1985, France, vol. 59, No. 4, ISSN 0007–4632, pages 361–377, REMONDI, B. W., "Global Positioning System carrier phase: description and use." Here the modulation contained in the GPS signal is removed in a GPS receiver, resulting in a pure carrier signal. Thus, the position of a moved GPS receiver is determined, with a carrier-phase measurement is performed, and so-called triple differences are also formed. During this determination of position, a known initial position of the moved GPS receiver serves as the starting point.

It is the object of the invention to disclose a generic method that permits a reliable, real-time-capable and high-precision determination of the position of a moved receiver, particularly during landing of an aircraft.

This object is accomplished by the features disclosed in the characterizing portion of claim 1. Advantageous embodiments and/or refinements can be inferred from the dependent claims.

A first advantage of the invention is that the navigational precisions reach the lower decimeter range through evaluation of pure carrier phases of the satellite signals, and thus meet the precision requirements of the precision landings up to CAT III conditions.

A second advantage is that the navigation method uses an analytical carrier-phase evaluation, and therefore yields an unambiguous, reliable navigation solution at any point in time.

A third advantage is that the navigation method can be initiated during movement, for example during a landing, because of the pure carrier-phase evaluation, and then permits high-precision navigation after a brief start-up period.

A fourth advantage is that the technical outlay and computer outlay for the navigation solution are so small that the navigation method is capable of use in real time in aircraft navigation, and that a spatially small, mechanically compact and reliable device can be produced for this purpose.

A fifth advantage is that the evaluation method also takes into consideration the future GNSS satellite constellation (operational constellation of GPS and GLONASS).

Further advantages ensue from the following description.

The invention is based on the carrier-phase measurements of the signals emitted by GPS and/or GLONASS satellites and/or pseudo-satellites. Pseudo-satellites, e.g., a plurality of ground stations, emit GNSS signals and have a known position. In high-precision navigation of an aircraft, particularly during landing, in addition to a GNSS on-board receiver, at least one GNSS receiver is required for performing carrier-phase measurement in a stationary reference station, as is a data link, for example a radio link, with which the carrier-phase corrections determined in the reference station are transmitted to the GNSS on-board receiver.

In the invention, an evaluation of the carrier-phase measurements of the GNSS satellite signals is used in accordance with the following formula.

$$\phi_E^S = (1/\lambda) \cdot R_E^S + \Delta R^S + \Delta R_E + \epsilon_E^S + N_E^S \qquad (1)$$

where $\phi_E^S$ is the measured carrier phase;

$\lambda$ is the wavelength of the emitted GNSS carrier signal;

$R_E^S$ is the geometric from between the satellite to the receiver;

$\Delta R^S$ are errors correlated between satellites, e.g., receiver clock errors;

$\Delta R_E$ are errors correlated between receivers, for e.g., errors of ephemeris parameters and satellite clocks, as well as of the ionosphere and troposphere;

$\epsilon_E^S$ are errors such as multiple-path propagation influences, dynamic influences and noise;

$N_E^S$ is a phase ambiguity at an initial time $t_0$.

The (subscript) numeral E indicates dependence on the receiver, and the (superscript) S indicates dependence on a satellite.

Figure 1:
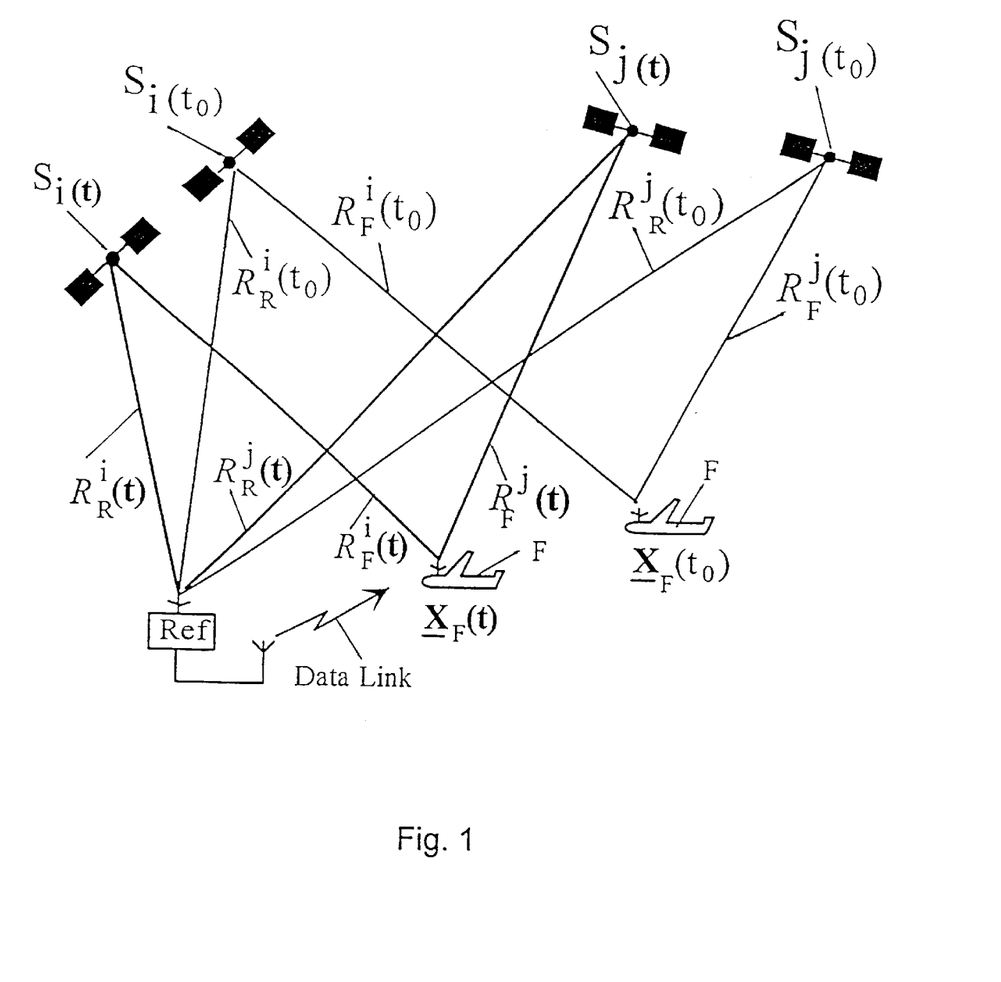
FIG. 1 shows the formation of triple difference.

In the invention, which is also called a TD6U method (Triple-Difference GPS with 6 Unknowns), a so-called triple difference of the carrier-phase measurements is formed between two receivers F (aircraft) and Ref (stationary reference station), two satellites $S_i$ and $S_j$, where i and j are whole numbers, and two times $t_0$ and t (FIG. 1), where t is greater than $t_0$, in accordance with the following formula:

$$\delta \nabla \Delta \phi \{[\phi_F^i(t)] - \phi_R^i(t) - [\phi_F^j(t) - \phi_{RR}^j(t)]\} - \{[\phi_F^i(t_0) - \phi_R^i(t_0)] - [\phi_F^j(t_0) - \phi_R^j(t_0)]\} \qquad (2)$$

This formula corresponds to the standard notation currently used in GPS literature. Here $\Delta$ is the difference shown in square brackets, $\nabla$ is the difference shown in wavy brackets, $\delta$ is the difference between the sets of wavy brackets, $\phi_R^i(t)$ is the carrier phase of the satellite $S_i$ measured at the reference station Ref at time t, $\phi_F^i(t)$ is the carrier phase of the satellite $S_i$ measured at the aircraft F at time t, $\phi_R^j(t)$ the carrier phase of the satellite $S_j$ measured at the reference station Ref at time t, $\phi_F^j(t)$ is the carrier phase of the satellite $S_j$ measured at the aircraft F at time t, $\phi_R^i(t_0)$ is the carrier phase of the satellite $S_i$ measured at the reference station Ref at time $t_0$, $\phi_F^i(t_0)$ is the carrier phase of the satellite $S_i$ measured at the aircraft F at time $t_0$.

$\phi_R^j(t_0)$ is the carrier phase of the satellite $S_j$ measured at the reference station Ref at time $t_0$, $\phi_F^j(t_0)$ is the carrier phase of the satellite $S_j$ measured at the aircraft F at time $T_0$.

The difference shown in square brackets [] is called single difference; the difference in wavy brackets {} is called double difference, and the difference between the sets of wavy brackets is called triple difference.

From formulas (1) and (2), it follows that $$R_F^i(t) - R_F^i(t_0) - R_F^i(t_0) + R_F^j(t_0) = \lambda \delta \nabla \phi + R_R^i(t) - R_R^j(t) - R_R^i(t^p) + R_R^j(t_0)$$

$$-[\epsilon_F^i(t) - \epsilon_R^j(t) - \epsilon_F^j(t) + \epsilon_R^j(t) - \epsilon_F^i(t_0) + \epsilon_R^j(t_0) - \epsilon_F^j(t_0) - \epsilon_R^j(t_0)] \qquad (3)$$

where $$\epsilon_E^S(\tau) S = i, j \ E = R, \ F \tau = t, \ t_0)$$

are errors of an observation which is dependent on satellites, receivers and time.

In the triple difference, the errors $\Delta R_E$ correlated between receivers, the errors $\Delta R^S$ correlated between satellites and the time-independent phase ambiguities $N_E^S$ are advantageously eliminated. The only condition for the elimination of the phase ambiguities is a continuous carrier-phase measurement, without cycle slips, between the two times t, $t_0$. The remaining, uncorrelated errors, the terms in square brackets in formula (3), are the influences of the aircraft dynamics, the multiple-path propagation influences and noise during carrier-phase measurement. These remaining errors are, however, within the millimeter or centimeter range after the triple difference formation.

To reduce the data to be transmitted from the reference station Ref to the user receiver, the correction values of the carrier phases are transmitted instead of the raw carrier phases. A correction value of the carrier phase is determined by comparing the measured, integrated Doppler displacement with the integrated Doppler displacement calculated with the known reference position and the satellite trajectory in accordance with the formula $$\phi_{Korr}(t) = [R_R(t) - R_R^i(t_{Anf})] - \lambda [\phi_R^i(t) - \phi_R^i(t_{Anf})] \qquad (4)$$

where $t_{Anf}$ relates to an initial time at the reference station, and i indicates a value in dependence with an arbitrary, received satellite. The difference in the first set of square brackets describes the anticipated Doppler displacement, and the difference in the second set of square brackets describes the measured, integrated Doppler displacement. If the time $t_0$ in formula (3) is greater than $t_{Anf}$, the difference $\phi_{Korr}(t) - \phi_{Korr}(t_0)$, coincides with the temporal difference between the reference values in formula (3).

The unknowns to be resolved are contained in the distance values related to the on-board receiver, shown on the left side in formula (3):

$$F(t, t_0, i, j) = R_F^i(t) - R_F^j(t) - R_F^i(t_0) + R_F^j(t_0).$$

The unknowns are the positions of the on-board receiver at times t and $t_0$:

$$(X_B(t), Y_B(t), Z_B(t), X_B(t_0), Y_B(t_0), Z_B(t_0)).$$

The solution of these unknowns is effected with an analytical method, for example according to a method of linear estimation theory, e.g., the method of least squares, or Kalman filtering, with the triple-difference equations that have been linearized around an estimation point. With an estimation point $$(X_F(t), Y_F(t), Z_F(t), X_F(t_0), Y_F(t_0), Z_F(t_0))$$

the result is $$X_F(t) = X_F^*(t) + dX_F, \; Y_F(t) = Y_F^*(t) + dY_F, \; Z_F(t) = Z_F^*(t) + dZ_F$$

$$X_F(t_0) = X_F^*(t_0) + dX_F, \; Y_F(t_0) = Y_F^*(t_0) + dY_F, \; Z_F(t_0) = Z_F^*(t) + dZ_F$$

and $$R_F^{i*}(t) = \sqrt{(X_F^*(t) - X^1(t))^2 + (Y_F^*(t) - Y^1(t))^2 + (Z_F^*(t) - Z^1(t))^2}$$

$$R_F^{j*}(t) = \sqrt{(X_F^*(t) - X^j(t))^2 + (Y_F^*(t) - Y^j(t))^2 + (Z_F^*(t) - Z^j(t))^2}$$

$$R_F^{i*}(t_0) = \sqrt{(X_F^*(t_0) - X^1(t_0))^2 + (Y_F^*(t_0) - Y^1(t_0))^2 + (Z_F^*(t_0) - Z^1(t_0))^2}$$

$$R_F^{j*}(t_0) = \sqrt{(X_F^*(t_0) - X^j(t))^2 + (Y_F^*(t_0) - Y^j(t))^2 + (Z_F^*(t_0) - Z^j(t))^2} \; .$$

where the superscript letters i and j indicate the values of the satellites $S_i$ and $S_j$.

Around the estimation point, formula (3) is linearized to $$\frac{\partial F(t, t_0, i, j)}{\partial X_F(t)} \Delta X_F(t) + \frac{\partial F(t, t_0, i, j)}{\partial Y_F(t)} \Delta Y_F(t) + \qquad (6)$$

$$\frac{\partial F(t, t_0, i, j)}{\partial Z_F(t)} \Delta Z_F(t) + \frac{\partial F(t, t_0, i, j)}{\partial X_F(t_0)} \Delta X_F(t_0) +$$

$$\frac{\partial F(t, t_0, i, j)}{\partial Y_F(t_0)} \Delta Y_F(t_0) + \frac{\partial F(t, t_0, i, j)}{\partial Z_F(t_0)} \Delta Z_F(t_0) =$$

$$\lambda \nabla \Delta \phi + R_R^i(t) - R_R^j(t) - R_R^i(t_0) + R_R^j t_0 - R_F^{i*}(t) +$$

$$R_F^{j*}(t) + R_F^{i*}(t_0) - R_F^{j*}(t_0) - \epsilon_F^j(t) + \epsilon_R^j(t) + \epsilon_F^j(t) -$$

$$\epsilon_R^j(t) + \epsilon_F^j(t_0) - \epsilon_R^j(t_0) - \epsilon_F^j(t_0) + \epsilon_R^j(t_0)$$

where $$\frac{\partial F(t, t_0, i, j)}{\partial X_F(t)} = \frac{\partial R_F^i(t)}{\partial X_F(t)} - \frac{\partial F_F^j(t)}{\partial X_F(t)} = \qquad (7a)$$

$$\partial \frac{\sqrt{(X_F(t) - X^1(t))^2 + (Y_F(t) - Y^1(t))^2 + (Z_F(t) - Z^1(t))^2}}{\partial X_F(t)} -$$

$$\frac{\partial \sqrt{(X_F(t) - X^j(t))^2 + (Y_F(t) - Y^j(t))^2 + (Z_F(t) - Z^j(t))^2}}{\partial X_F(t)} =$$

$$\frac{X_F^*(t) - X^1(t)}{R_F^{1*}(t)} - \frac{X_F^*(t) - X^j(t)}{R_F^{j*}(t)}$$

and, analogously to (7a), $$\frac{\partial F(t, t_0, i, j)}{\partial Y_F(t)} = \frac{Y_F^*(t) - Y^i(t)}{R_F^{i*}(t)} - \frac{Y_F^*(t) - Y^j(t)}{R_F^{j*}(t)} \qquad (7b)$$

$$\frac{\partial F(t, t_0, i, j)}{\partial Z_F(t)} = \frac{Z_F^*(t) - Z^i(t)}{R_F^{i*}(t)} - \frac{Z_F^*(t) - Z^j(t)}{R_F^{j*}(t)} \qquad (7c)$$

$$\frac{\partial F(t, t_0, i, j)}{\partial X_F(t_0)} = \frac{X_F^*(t_0) - X^i(t_0)}{R_F^{i*}(t_0)} - \frac{X_F^*(t_0) - X^j(t_0)}{R_F^{j*}(t_0)} \qquad (7d)$$

$$\frac{\partial F(t, t_0, i, j)}{\partial Y_F(t_0)} = \frac{Y_F^*(t_0) - Y^i(t_0)}{R_F^{i*}(t_0)} - \frac{Y_F^*(t_0) - Y^j(t_0)}{R_F^{j*}(t_0)} \qquad (7e)$$

$$\frac{\partial F(t, t_0, i, j)}{\partial Z_F(t_0)} = \frac{Z_F^*(t_0) - Z^i(t_0)}{R_F^{i*}(t_0)} - \frac{Z_F^*(t_0) - Z^j(t_0)}{R_F^{j*}(t_0)} \qquad (7f)$$

The position of the user receiver can be represented with n satellites (n>6) according to the formula $$\underline{AX} = \lambda[\underline{D\phi}_F(t) - \underline{D\phi}_F(t_0)] - \lambda[\underline{D\phi}_R(t) - \underline{D\phi}_R(t_0)] + \qquad (8)$$

$$[\underline{DR}_R(t) - \underline{DR}_R(t_0)] - [\underline{DR}^*{}_F(t) - \underline{DR}1^*{}_F(t_0)] +$$

$$[\underline{D\epsilon}_R(t) - \underline{D\epsilon}_R(t_0)] - [\underline{D\epsilon}_F(t) - \underline{D\epsilon}_F(t_0)]$$

where $X = [\Delta X_F(t), \Delta Y_F(t), \Delta Z_F(t) \text{m} \; \Delta X_F(t_0), \Delta Y_F(t_0), \Delta Z_F(t_0) 0]^T$ state vector $\phi_R(t) = [\phi_R^1(t), \phi_R^2(t), \ldots \phi_R^n(t)]^T$ vector of the measure phases at time t $\phi_R(t_0) = [\phi_R^1(t_0), \phi_R^2(t_0), \ldots \phi_R^n(t_0)]^T$ vector of the measure phases of the reference receiver at initial time $t_0$ $\phi_F(t) = [\phi_F^1(t), \phi_F^2(t), \ldots \phi_F^n(t)]^T$ vector of the measure phases of the user receiver at time t $\phi_F(t_0) = [\phi_F^1(t_0), \phi_R^2(t_0), \ldots \phi_F^n(t_0)]^T$ vector of the measure phases of the user receiver at initial time $t_0$ $R_R(t) = [R_R^1(t), R_R^2(t), \ldots R_R^n(t)]^T$ distance vector from the reference receiver to the satellites at t $R_R(t_0)=[R_R^1(t_0), R_R^2(t_0), \ldots R_R^n(t_0)]^T$ distance vector from the reference receiver to the satellites at $t_0$ $R_{\hat{F}}(t)=[R_F^{1*}(t), R_F^{2*}(t), \ldots R_F^{n*}(t)]^T$ distance vector of estimated user receiver position with respect to the satellites at t $R_{\hat{F}}(t_0)=[R_F^{1*}(t_0), R_F^{2*}(t_0), \ldots R_F^{n*}(t_0)]^T$ distance vector of the estimated user receiver position with respect to the satellites at $t_0$ $\epsilon_R(t)=[\epsilon_R^1(t), \epsilon_R^2(t), \ldots \epsilon_R^n(t)]^T$ vector of the residual errors of the reference receiver at t $\epsilon_R(t_0)=[\epsilon_R^1(t_0), \epsilon_R^2(t_0), \ldots \epsilon_R^n(t_0)]^T$ vector of the residual errors of the reference receiver at $t_0$ $\epsilon_F(t)=[\epsilon_F^1(t), \epsilon_F^2(t), \ldots \epsilon_F^n(t)]^T$ vector of the residual errors of the user receiver at t $\epsilon_F(t_0)=[\epsilon_F^1(t_0), \epsilon_F^2(t_0), \ldots \epsilon_F^n(t_0)]^T$ vector of the residual errors of the user receiver at $t_0$ $$\underline{A} = \begin{bmatrix} a_{11} & a_{12} & \ldots & a_{16} \\ a_{21} & a_{22} & \ldots & a_{26} \\ & & \cdot & \\ & & \cdot & \\ & & \cdot & \\ a_{m1} & a_{m2} & \ldots & a_{m6} \end{bmatrix}$$

geometry matrix with the elements of formula (7)

$$\underline{D} = \begin{bmatrix} -1 & 1 & 0 & \ldots & 0 \\ -1 & 0 & 1 & \ldots & 0 \\ \cdot & & \cdot & & \\ \cdot & & & \cdot & \\ \cdot & & & & \\ -1 & & & & 1 \end{bmatrix}$$

The positions of the user receiver at times t and $t_0$ can be determined from formula (8), for example with the method of least squares, according to the following formula:

$$\hat{X}=(A^TA)^{-1}A^TZ$$

with $$\hat{X}=[\Delta X_F(t), \Delta Y_F(t), \Delta Z_F(t), \Delta X_F(t_0), \Delta Y_F(t_0), \Delta Z_F(t_0)]^T$$

as a vector having deviations at an estimation point $[X_F(t), Y_F(t), Z_F(t), X_F(t_0), Y_F(t_0), Z_F(t_0)0]^T$ $Z=\lambda[D\phi_F(t)-D\phi_F(t_0)]-\lambda[D\phi_R(t)-D\phi_R(t_0)]=[DR_R(t)-DR_R(t_0)]-[DR_F(t)-DR_F(t_0)]$

DESCRIPTION OF THE PREFERRED EMBODIMENTS

FIG. 1 illustrates the formation of these triple differences using aircraft navigation as an example. The user receiver on board an aircraft F, and the reference receiver in a stationary reference station Ref, continuously receive signals from two satellites $S_i$ and $S_j$. At a time $t_0$, the satellites $S_i$, $S_j$ and the aircraft F are located in the initial positions $S_i(t_0)$, $S_j(t_0)$ and $X_F(t_0)$. The initial time $t_0$ can be an arbitrary time, e.g., a time shortly before landing. The positions of the satellites $S_i$ and $S_j$ at times t and $t_0$ are known, as is the position of the stationary reference station Ref. The carrier-phase corrections determined at the reference station are transmitted to the aircraft F via a data link, for example a data channel or language channel. On board the aircraft F, the triple-difference equations are formed from the carrier phases measured on board and the transmitted carrier-phase corrections.

Instead of determining the phase ambiguities as unknowns, as in a search method, in the TD6U method only the positions of the on-board receiver at the two times (six unknown coordinate values) are determined analytically in the triple-difference equations. Because each pair of satellites yields a triple-difference equation, at least seven satellite measurements are required to determine the six unknowns.

Figure 2:
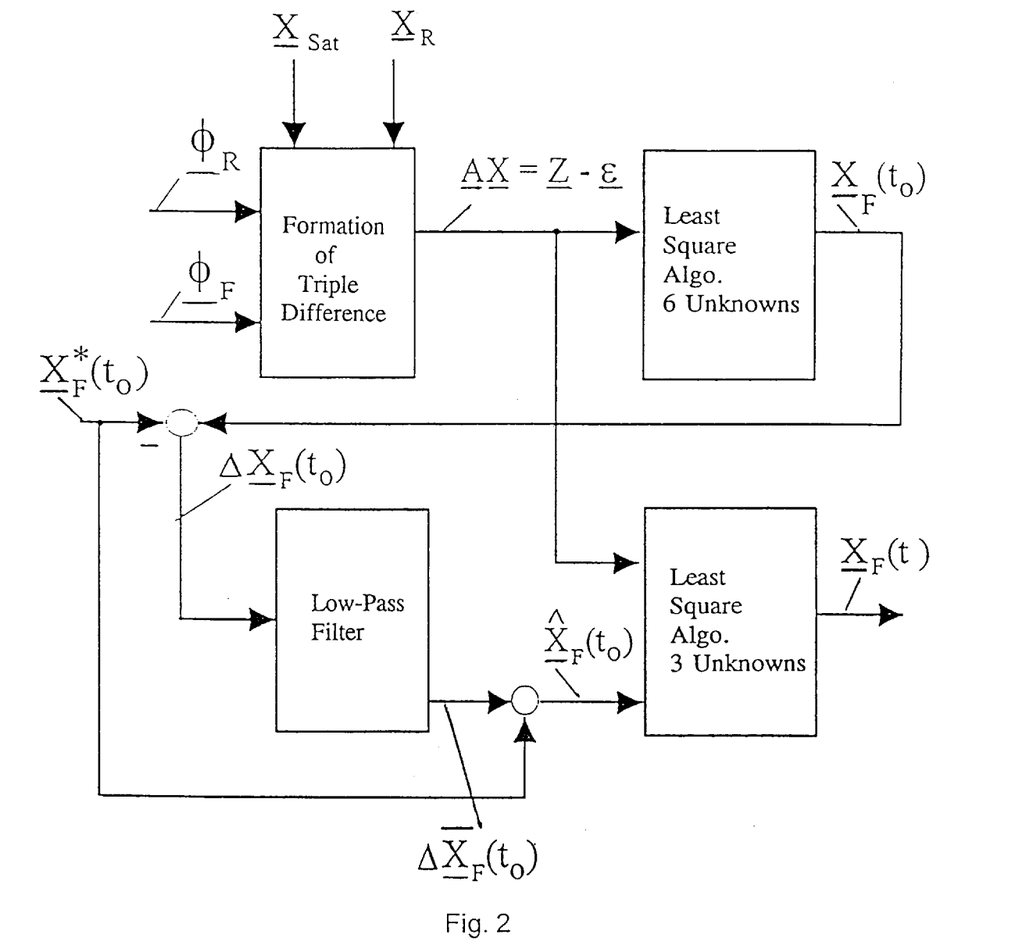
FIG. 2 is a schematic circuit diagram.

FIG. 2 shows a schematic representation of a circuit diagram for determining the three coordinates that determine the current position $X_F(t)$ of the aircraft F, that is, the navigation values. In this instance, the six unknowns (coordinates at initial time $t_0$ and the current time t) are first determined with sufficient triple-difference equations using an analytical method, for example the method of least squares, also called the least-square algorithm (LSQ). Of the six unknowns, only the coordinate values of the current position are used for navigation. The coordinate values of the initial position (at time $t_0$) are not used directly. The initial position in the position solutions is not known, but does not change over time, so this position can be statistically evaluated in an advantageous manner. This property is utilized in order to reduce the noise component by means of a filter, preferably a low-pass filter, in the determination of the initial position.

The values of the initial position $X_F(t_0)$ that were determined by the first LSQ solutions with six unknowns are smoothed by the low-pass filter. To shorten the transient effect in the filter, the filter only assumes the difference with respect to an estimated initial position. The filtered initial position $X_F(t_0)$ is re-inserted into the triple-difference equations in order to determine the unknown, current position $X_F(t)$. In the second LSQ solution, however, the three coordinate values of the low-pass-filtered initial position are no longer considered as unknowns; only the three coordinates of the current position are.

The advantage of this method is that the geometrical influence in the second LSQ solution, which has three unknowns, is significantly lesser than in the first LSQ solution, which has six unknowns. Because of the temporal difference in the triple-difference equations, the influence of the geometry in the first LSQ solution is extremely dependent on the temporal interval between the initial time to and the current time t, and behaves like an $e^{-t/T}$ function with a time constant T, which is in a range of a few minutes. If the time spans between t and $t_0$ are short, the factor between the position error (1 σ) and the distance error (1 σ), the so-called PDOP (Position Dilution of Precision), can be greater than 100 in the first LSQ solution, with six unknowns, while the PDOP in the second solution, with three unknowns, is typically less than 3. Consequently, in the second LSQ solution, all residual errors of the triple-difference equations up to the estimation error of the initial position have less influence on the positioning precision.

A further advantage of this filtering method ensues from the clear separation between the initial position and the current position. Because the current position is unfiltered in navigation, the filtering of the initial position does not influence the dynamic behavior of the navigation, that is, real-time navigation is possible.

At least six simultaneous observation equations are necessary in order to solve six unknowns in the TD6U method. As already mentioned, this requires carrier-phase measurements by at least seven satellites. Even the entire GPS constellation, which has 24 satellites, can only achieve nearly 100% coverage of four satellites. The necessary availability (e.g., >98% under CAT I) necessary for precision landing, which is as yet unattainable, can, however, be augmented by the Russian satellite navigation system GLONASS or by pseudo-satellites (ground stations that emit GNSS signals). According to the complete GLONASS system design, at least eight satellites are visible at any time from any location on earth with a combined GPS/GLONASS system, so their GNSS signals can be received. The necessary satellite availability can also be assured by the support of three pseudo-satellites, preferably in the vicinity of a runway. In addition to the combination with further satellites, this method can also be used, without additional satellites, in combination with more than one ground station. Because the method includes at least four satellites or three triple-difference equations with each reference station by way of the GPS satellite constellation, the method can also be used with GPS alone, by means of two reference stations at which at least six independent equations are to be obtained. Moreover, because of its real-time capability, the method can also be used in other kinematic real-time applications in which continuous availability of satellites is not required.

The TD6U method of the invention was tested in experimental tests with independent reference systems. For safety reasons, the evaluations of the recorded data were performed under a pseudo-real-time condition, that is, the measured TD6U data were fed into an evaluating unit at an interface of a data memory (file). only the data that were available until entry were used in the evaluation.

The first test was performed by a DGPS state measurement at two measurement points. The antennas of two GPS receivers were set up at two measurement points, with the first GPS receiver being used as a reference station and the second as a "mobile station" (user receiver).

Figure 3:
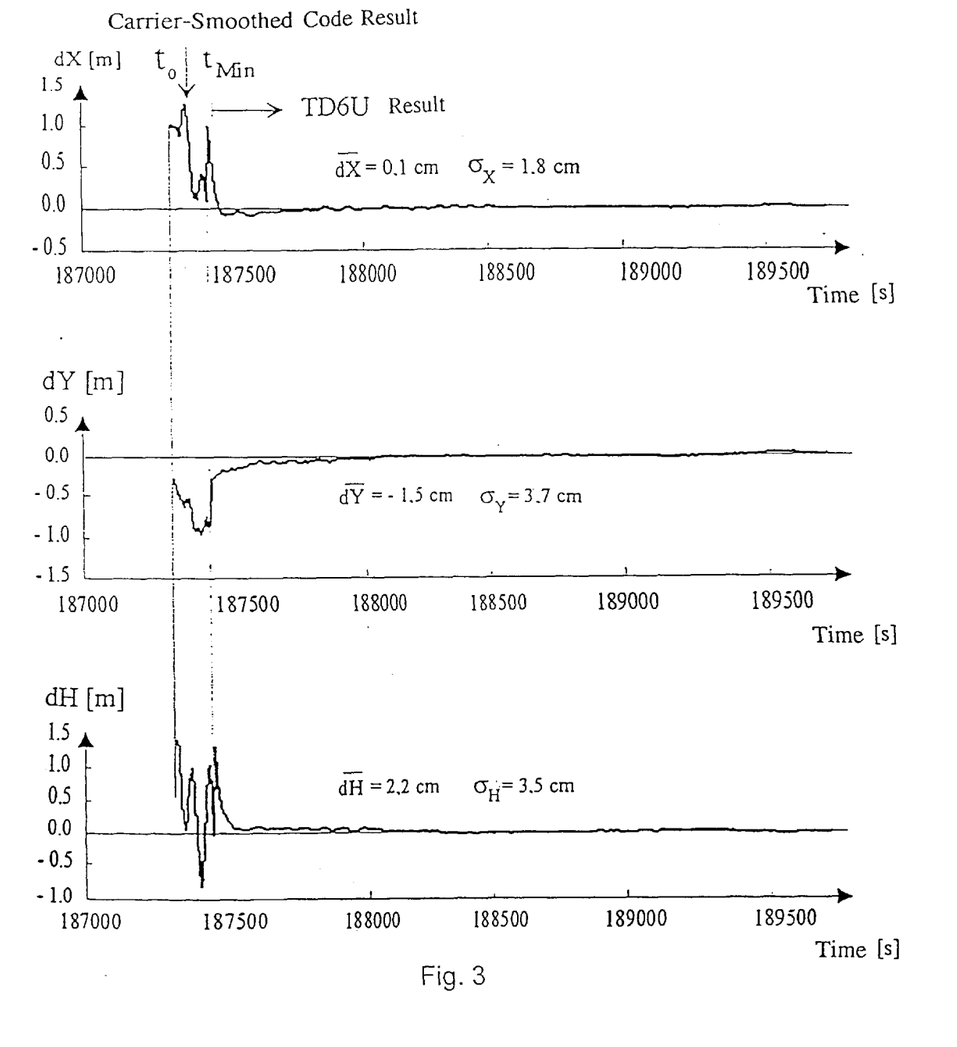
FIG. 3 shows evaluation results.

FIG. 3 shows the evaluation results with the TD6U method. In the evaluation the "mobile station" is considered to be unknown and mobile. From time $t_0$, signals from eight satellites having elevation angles greater than 7 degrees are received by the reference receivers and "mobile" receivers, so that sufficient satellite measurements are available for the TD6U solution. The time to is called the initial time for the TD6U solution. Because the geometry, or PDOP, of the triple-difference equation with six unknowns is unfavorable during a short time span, at initial time $t_0$ only the measured values are registered, and the procedure is not started until two minutes later, at time $t_{Min}$. In the interval between $t_0$ and $t_{Min}$, the evaluation is performed with the aforementioned "carrier-smoothed code." The maximum deviation of the measured position of the "mobile" receiver from the actual position that is determined with high precision during this phase is approximately 1.5 m. As of time $t_{Min}$, the method of the invention (TD6U solution) is started from an initial position estimated by the carrier-smoothed code ($X_F^*(t_0)$ in FIG. 2). The precision of this estimation is generally in a range of meters. A substantial estimating error, for example of 100 m, can impede the transient effect, but not the stability and the end value. The values of the initial position determined by the first LSQ solutions with six unknowns are low-pass filtered with a filter time constant of 15 seconds (FIG. 2). The estimation error is thus reduced by approximately 80% after the first 30 seconds. After this short transient effect, the error components of the filtered initial position fall, in all directions, below an error value of 25 cm. Because of the time behavior of the PDOP change (such as an $e^{-t/T}$ function with a time constant T of approximately 3 minutes), the courses (transient effects) of the deviations in position have lasted approximately 10 minutes (3 T) until the position precision converges to an error of less than five centimeters. Long-wavelength residual errors of the carrier-phase differences, such as low-frequency, multiple-path propagation influences, can, as already mentioned, affect the TD6U precisions in a disadvantageous manner. The errors in the carrier-phase measurements that were caused by the multiple-path propagation are in the millimeter or centimeter range. Although the measuring environment cannot be classified as favorable in this case, the influence of the long-wavelength residual errors on the position remains less than an error value of 25 cm, even with the initially unfavorable geometry. The precision is greatly increased in comparison to the prior art, the carrier-smoothed code.

Figure 4:
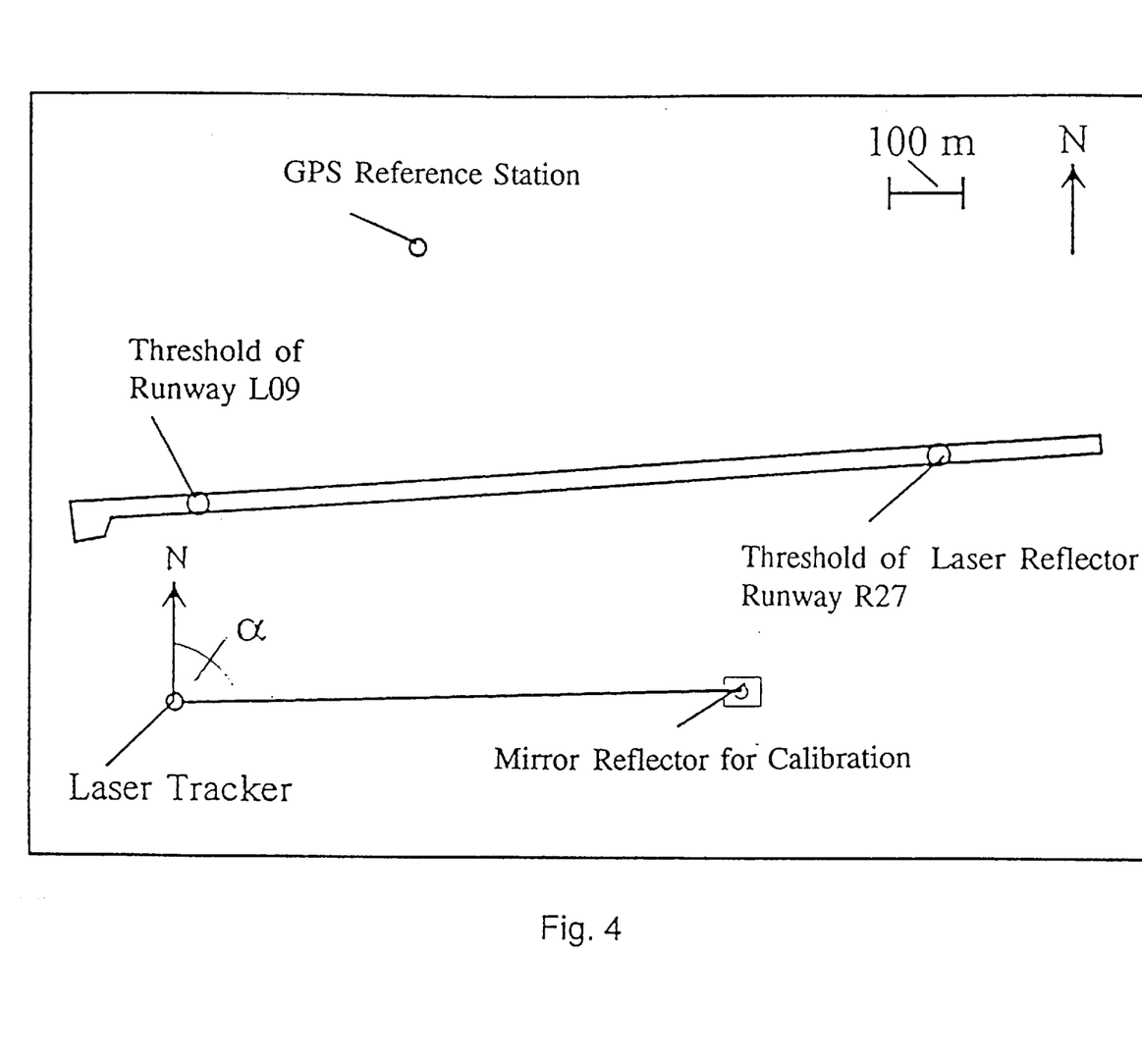
FIG. 4 shows the locations of GPS reference station and laser tracker.
Figure 5:
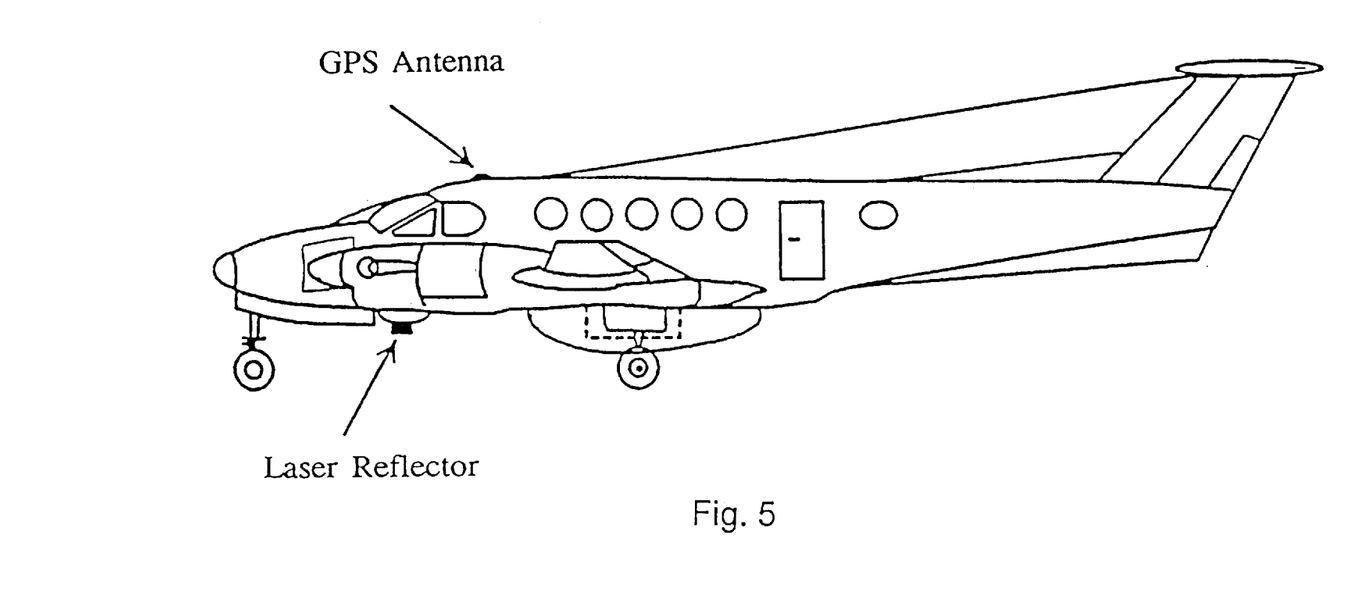
FIG. 5 shows the locations of the installation of the GPS antenna and the laser reflector.

The second test was performed in a flight test with a so-called laser tracker (laser distance-measuring device) as an absolute reference. The laser tracker can be used to determine the three-dimensional position of a laser mirror reflector. FIG. 4 shows the locations of the GPS reference station and the laser tracker, which were already measured with high precision in the WGS84 coordinate system prior to the flight test. A laser mirror reflector of the laser tracker and the GPS antenna were attached to a test aircraft, for example a two-engine propeller aircraft, as shown in FIG. 5. The laser tracker can radiate a laser signal to the reflector attached to the aircraft. The bearing angle and the distance (corresponding to the transit time of the laser signal) between the laser tracker and the mirror reflector are determined by the reception of the reflected laser signal. The measuring precisions of the laser tracker used here are illustrated below in Table 2:

| Measured Value | Precision | Resolution |
| --- | --- | --- |
| elevation | 0.01° | 0.001° |
| azimuth | 0.01° | 0.001° |
| distance | 0.15 m ± 5 = $10^{16}$ distance | 0.01 m |

Prior to the flight test, the laser tracker was calibrated (gauged) by means of a (gauging) mirror reflector attached to the so-called airport tower (FIG. 4). This calibration can, however, have an offset within the precision tolerance based on the measuring precisions shown in Table 2. If, for example, a calibration error of 0.010 exists in the elevation angle, this error effects a vertical error of approximately 0.22 m at the runway threshold R27 (distance between the runway threshold and the laser tracker: approximately 1250 m).

Figure 6A:
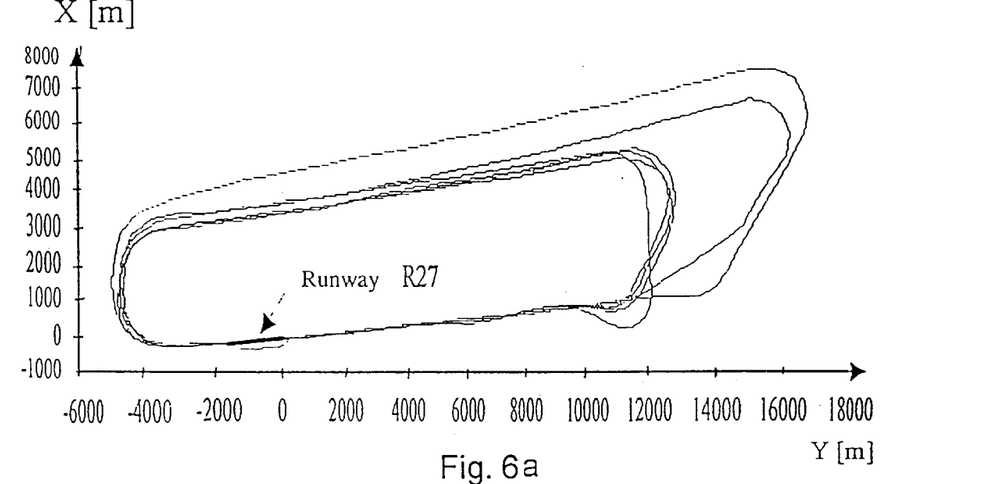
FIG. 6 shows the trajectories of five approach patterns in vertical and horizontal planes.
Figure 6B:
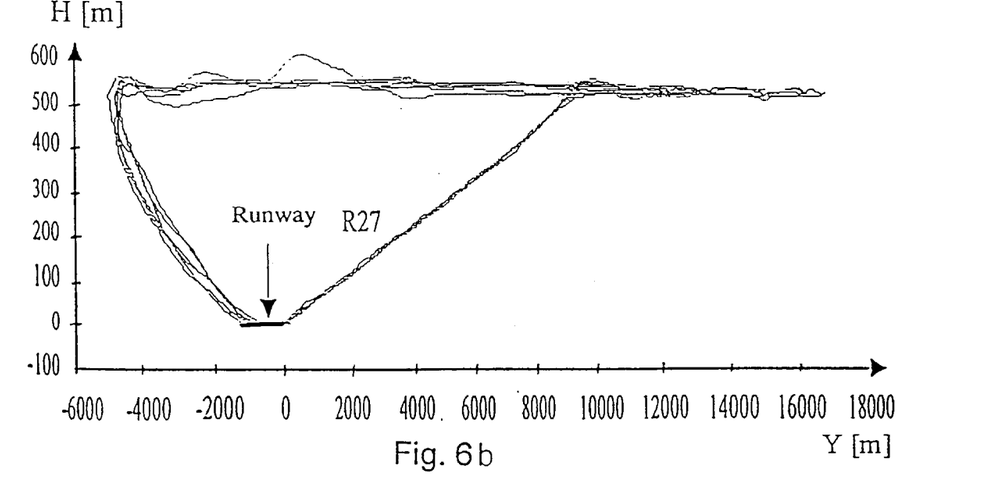

Two GPS receivers having 10 receiving channels were used during the flight test. The antenna of the on-board receiver (reference receiver) was located at the reference point shown in FIG. 4. Six landings were made at different intercept angles. FIG. 6 shows the trajectories of the six approach patterns in the horizontal and vertical planes.

The six landings are evaluated with both the GPS measured data, using the TD6U method, and the measured data of the laser tracker. The two results are compared in the landing phases. FIG. 7 shows the PFE and CMN errors from the comparison of the TD6U results with the laser tracker results in the end phases of the landings. With the TD6U method, in five of the six landings, the evaluations are only possible at a time of 4 to 6 minutes prior to landing because of the shadowing of a few satellite signals during the respective curved flight (number of received satellites less than 7). Although the geometrical conditions are unfavorable due to the short time spans, and the error of the laser tracker measurement must be taken into consideration, the comparison results of all six landings meet the requirements of precision landings. The requirements of the CAT I through CAT III conditions are also included to assess the bearing precisions. Table 3 summarizes the PFE errors of all landings at heights above the runway threshold (HAT) of 50 ft and 100 ft (decision height for CAT III and CAT II) with the average value and the scatter:

| HAT | Y Avg. Value | Y Scatter | H Avg. Value | H Scatter |
|---|---|---|---|---|
| 50 ft | 0.66 m | 0.21 m | 0.61 m | 0.26 m |
| 100 ft | 0.71 m | 0.22 m | 0.62 m | 0.27 m | where

HAT (Height Above Threshold) is the height above the runway threshold in feet (ft), Y is the direction transverse to the runway, and H is the vertical direction.

To generate a reference, the three-dimensional position of the runway was measured with high precision by the laser tracker. With the use of the low-pass filter for the initial position and the subsequent LSQ solution with three unknowns (FIG. 2), the high-frequency error components of the initial position are reduced to the centimeter range.

The CMN errors shown in FIG. 7 essentially contain the high-frequency errors of the laser tracker.

The measured runway was used for the third test. To check the TD6U bearing precision under the dynamic conditions, the height profile of the runway also offers an absolute reference. The height profile of the runway was measured in a rolling experiment, with the same measuring equipment, between the points of the runway threshold L09 and R27. The measuring precision included an error of less than 10 cm.

Figure 8A:
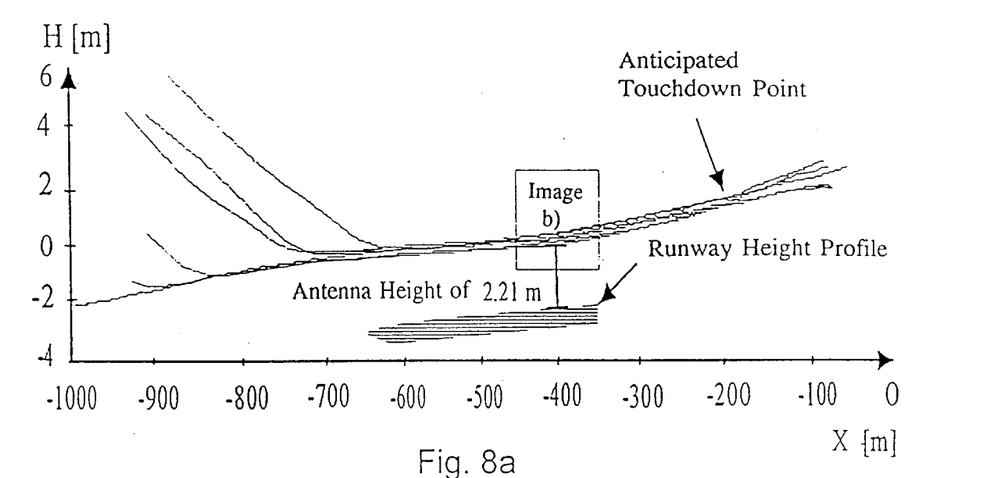
FIG. 8a shows the height tracking during landing and starts.
Figure 8B:
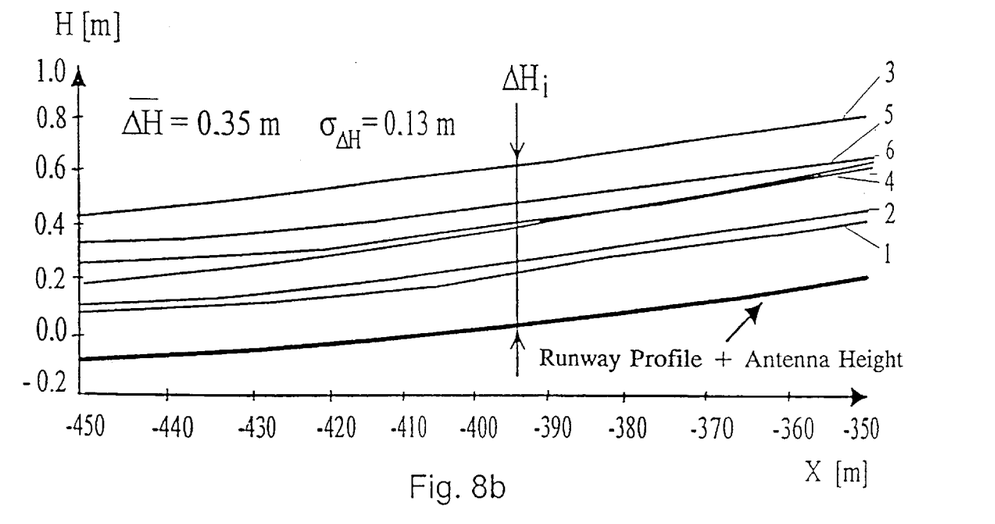
FIG. 8b shows the height tracking during rolling.

FIG. 8a) shows the height trajectories of all six landings in the runway region. The touchdown point sought by the pilot is in a range of 150 to 180 m behind the runway threshold R27. The GPS antenna was secured above the fuselage (FIG. 5) and, when the aircraft is standing, is 2.21 m from the ground. FIG. 8b) further shows a cutout of the rolling phase, in which the deviations from the nominal profile can be seen more clearly. Because the precision of the reference system is better in comparison with that of the laser tracker, the deviations detected here are smaller than in the comparison results with the laser tracker. The average value of the height differences with respect to the measured runway profile is 0.35 m, and the scatter is 0.13 m. The average value comprises a TD6U offset, a measurement error of the runway and an operation error in the antenna setup of the reference station. In comparison with the average value of the vertical PFE error (0.61 m to 0.62 m) in Table 3, the average value is smaller and the difference between the two results corresponds to the precision of the laser tracker. In contrast to the comparison results with the laser tracker, here the scatter is the pure scatter of the TD6U error, because the runway remains constant as the reference in all measurements. The difference in scatter compared with the result in Table 3 corresponds to the measurement scatter of the laser tracker.

With the above-described method, it is possible to activate a navigation system based on the method during precision flights. After a startup time of approximately two minutes, the system has a measuring error in the lower decimeter range for aircraft navigation.

Thus, the requirements for precision for an automatic landing are met up to CAT III.

The invention is not limited to the described embodiment, but can essentially be used in further high-precision, kinematic applications, such as photogrammetry, air gravimetry, loading and unloading in a dock area, etc. Legends for FIGS. 1 through 8. Shown are in FIG. 1 Triple differences between two receivers, two satellites and two times, where $X_F(t_0)$, $X_F(t)$ is the position of the on-board receiver at times $t_0$ and t.

FIG. 2 a circuit diagram of the TD6U method, where $X_{sat}$ is the vector of the satellite positions, $X_R$ is the antenna position of the reference receiver, $\phi_F$, $\phi_R$ is the vector of the carrier-phase measurements of the on-board and reference receivers, $X_F(t_0)$ is the initial position of the on-board receiver as determined with TD6U, $X_F^*$ is the estimated initial position of the on-board receiver, $\hat{X}_F(t_0)$ is the filtered initial position of the on-board receiver, $X_F(t)$ is the position of the on-board receiver at time t, and $AX=Z-\epsilon$ are triple-difference equations, where A is the geometry matrix, X is the state vector, Z is the measurement vector and E is the vector of the residual errors.

FIG. 3 Positioning with the TD6U method in a state measurement at two measuring points. Here dX, dY, dH refer to deviations in the north, east and vertical direction, respectively.

FIG. 4 Locations of the GPS reference station and laser tracker:

| | Width (°) | Length (°) | Height (m) |
|---|---|---|---|
| Threshold R 27: | 52,319806284 | 10,564011271 | 131,783 |
| Threshold L09: | 52,318825245 | 10,546496411 | 126,234 |
| Ref. Station: | 52,322412511 | 10,551039872 | 128,670 |
| Laser Tracker: | 52,316166451 | 10,546340591 | 125,794 |

FIG. 5 Locations of installation of the GPS antenna and the laser reflector.

FIG. 6 Trajectories of five approach patterns in the horizontal and vertical planes during a flight test, where X, Y, H are coordinates in the north, east and height directions, respectively, with the runway threshold R27 as the point of origin (0, 0, 0).

Figure 7A:
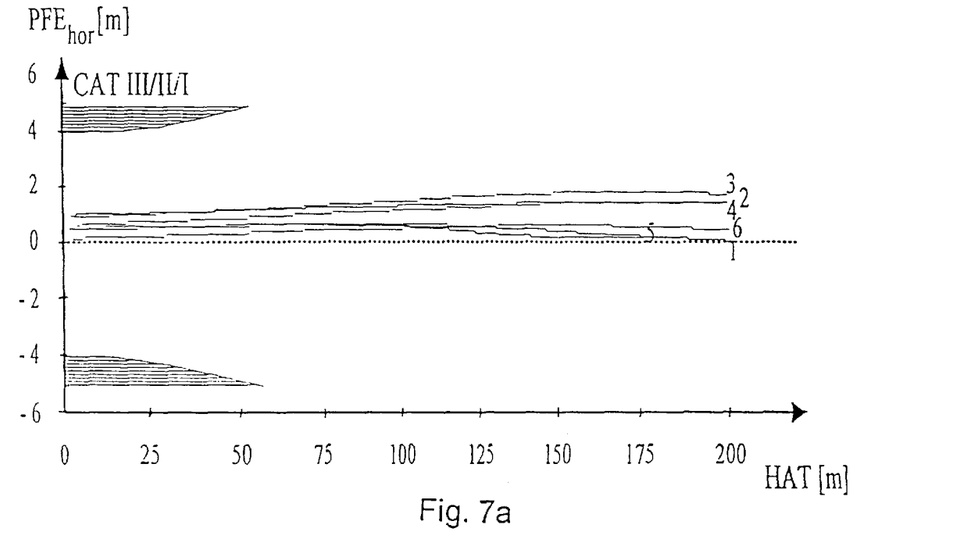
FIGS. 7a, 7b, 7c and 7d show comparison results between TD6U and the laser tracker during the end phases of the landings.
Figure 7B:
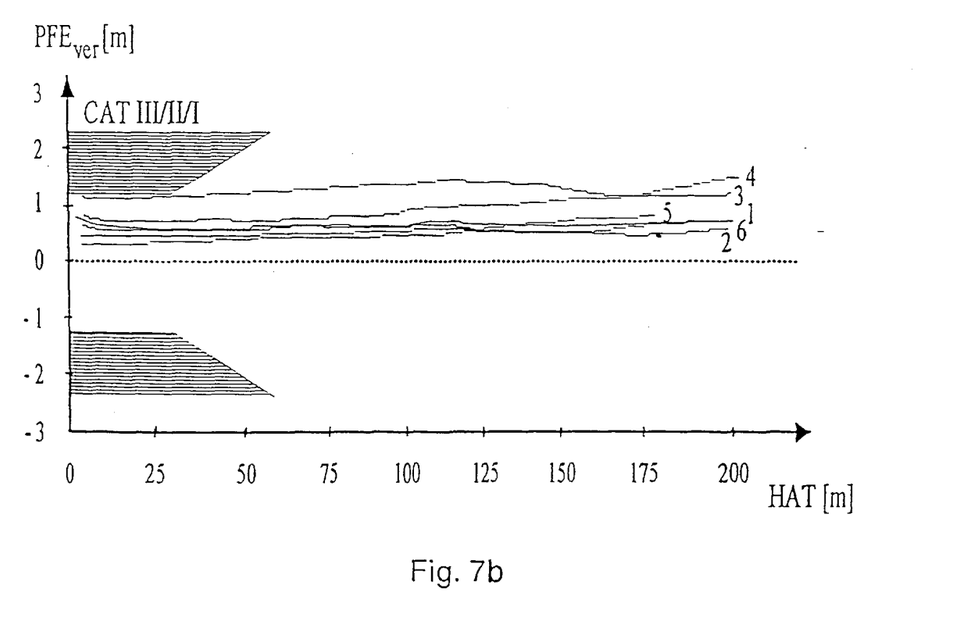
Figure 7C:
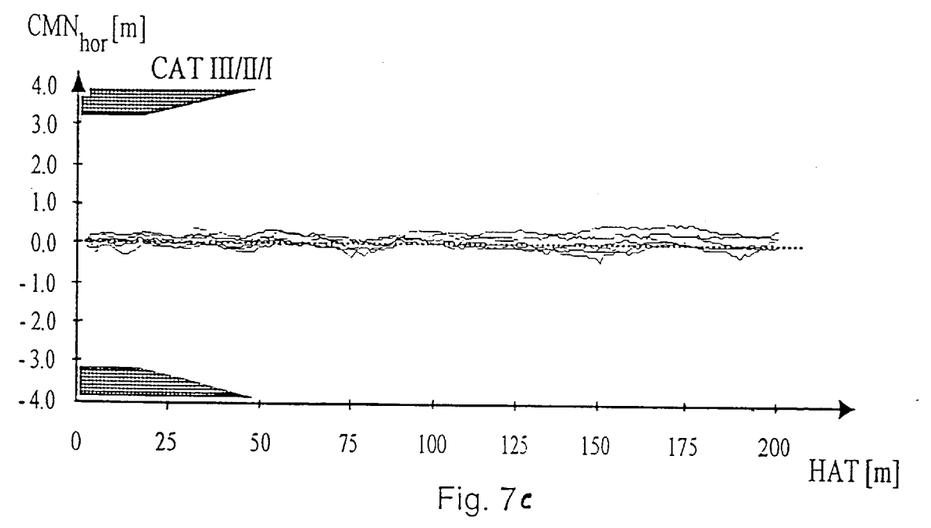
Figure 7D:
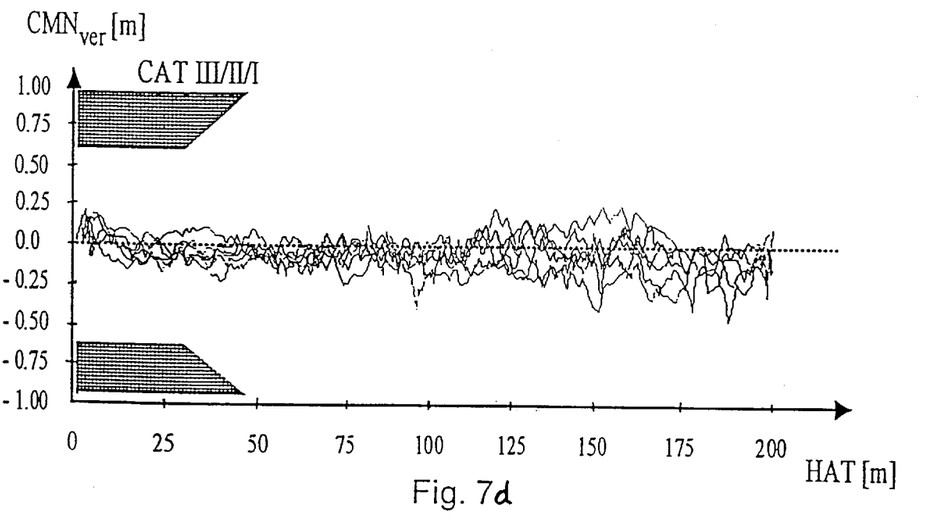

FIGS. 7a), 7b) Comparison results between TD6U and the laser tracker during the end phases of the landings.

FIG. 7a) PFE (Path Following Error) component,

FIG. 7b) CMN (Control Motion Noise) component, where HAT (Height Above Threshold) is the height above the runway threshold.

FIGS. 8a, 8b Height comparisons with the runway profile (including antenna height).

FIG. 8a Height tracking during landings and starts (touch and go),

FIG. 8b Height tracking during rolling, where

H is the height of the GPS antenna in the aircraft with respect to the runway threshold R27, $\Delta H_i$ is the difference in height between the GPS antenna and the height of the runway profile+antenna height during the i-th landing, and X is the distance from the runway threshold R27 on the center line.

I claim:

1. Satellite navigation system having a mobile user receiver and a reference station, whose position is known, wherein the signals emitted by a plurality of satellites are received and evaluated in the user receiver and the reference station, and the position of the user receiver is thereby determined, wherein the signals received from a plurality of satellites ($S_i$, $S_j$) and/or pseudo-satellites are evaluated in the user receiver and reference station (Ref) by means of a carrier-phase measurement according to the formula $$\phi_E^S = (1/\lambda) \cdot (R_E^S + \Delta R^S + \Delta R_E + \epsilon_E^S) + N_{ES}$$

where $\phi_E^S$ is the measured carrier phase;

$\lambda$ is the wavelength of the emitted GNSS carrier signal;

$R_E^S$ is the geometric distance from the satellite to the receiver;

$\Delta R^S$ are errors correlated between satellites;

$\Delta R_E$ are errors correlated between receivers;

$\epsilon_E^S$ are errors such as multiple-path propagation and dynamic influences;

$N_E^S$ is the phase ambiguity at an initial time $t_0$ and triple difference is formed from the carrier phases determined at the initial time ($t_0$) and a current time (t where $t > t_0$) according to the formula $$\overline{\delta \nabla \Delta \phi} = \{[\Psi_F(t) - \phi_R(t)] - [\phi_F^j(t) - \phi_R^j(t)]\} - \{[\phi_F(t_0) - \phi_R(t_0)] - [\phi_F^j(t_0) - \phi_R^j(t_0)]\}$$

where $\phi$ is the carrier phase, $\Delta$ is the difference shown in square brackets, $\nabla$ is the difference shown in wavy brackets, $\delta$ is the difference between the sets of wavy brackets, t is the current time, $t_0$ is the initial time, $\phi_R^i(t)$ is the carrier phase of the satellite $S_i$ measured at the reference station Ref at time t, $\phi_F^i(t)$ is the carrier phase of the satellite $S_i$ measured at the user receiver F at time t, $\phi_R^j(t)$ is the carrier phase of the satellite $S_j$ measured at the reference station Ref at time t, $\phi_F^j(t)$ is the carrier phase of the satellite $S_j$ measured at the user receiver F at time t, $\phi_R^i(t_0)$ is the carrier phase of the satellite $S_i$ measured at the reference station Ref at initial time $t_0$, $\phi_F^i(t_0)$ is the carrier phase of the satellite $S_i$ measured at the user receiver F at initial time $t_0$, $\phi_R^j(t_0)$ is the carrier phase of the satellite $S_j$ measured at the reference station Ref at initial time $t_0$, $\phi_F^j(t_0)$ is the carrier phase of the satellite $S_j$ measured at the user receiver F at initial time $t_0$, characterized in that the positions of the user receiver at times t and $t_0$ are determined from the triple difference using an analytical method with at least six triple-difference equations that have been linearized around an estimation point, wherein the position of the user receiver at an initial time ($t_0$) is evaluated statistically based on its temporally-unchanged characteristic, that the values of the position at the initial time ($t_0$), which have been determined with the use of the position solution with six unknowns, are smoothed by low-pass filtering, the statistically-evaluated position of the user receiver at the initial time ($t_0$) is inserted as a known position into the observation equations, and only the current position of the user receiver is subsequently determined at a predefinable, current time (t).

2. Satellite navigation method according to claim 1, characterized in that a phase-correction value $\phi_{Korr}(t)$ is determined in the reference station (Ref) according to the formula $$\phi_{Korr}(t) = [R_R^i(t) - R_R^i(t_{Anf})]/\lambda [\phi_R^i(t) - _R^i(t_{Anf})]$$

where $t_{Anf}$ is the initial time at the reference station, $\lambda$ is the wavelength of the emitted GNSS signal, $R_R^i(t)$ is the geometric distance from the satellite $S_i$ to the reference station at time t, $R_R^i(t)$ is the geometric distance from the satellite $S_i$ to the reference station at time $t_{Anf}$, $\phi_R^i(t)$ is the carrier phase of the satellite $S_i$ measured at the reference station Ref at time t, $\phi_R^i(t_{Anf})$ is the carrier phase of the satellite $S_i$ measured at the reference station Ref at time $t_{Anf}$, the phase-correction value is transmitted to the user receiver by way of a data-transmission circuit, the carrier phase determined in the user receiver is corrected in the user receiver as a function of the phase-correction value, and that the position of the user receiver is determined from the corrected carrier phase.

3. Satellite navigation method according to claim 1, characterized in that an estimation value is used for determining the initial position of the user receiver.

4. Satellite navigation method according to claim 1, characterized in that the user receiver is attached to an aircraft.

5. Satellite navigation method according to claim 1, characterized in that at least one stationary reference station (Ref) having a known position is set up in the vicinity of a runway as a landing aid for aircraft.

6. Satellite navigation method according to one claim 1, characterized in that, in addition to the reference station (Ref), at least one pseudo-satellite station is set up in the vicinity of the runway.

* * * * *